(12) United States Patent
Chen et al.

(10) Patent No.: US 11,063,520 B2
(45) Date of Patent: Jul. 13, 2021

(54) SIMPLIFIED HYBRID PWM/PFM CONTROL METHOD FOR SLLC CONVERTER

(71) Applicant: Murata Manufacturing Co., Ltd., Nagaokakyo-shi, Kyoto-fu (JP)

(72) Inventors: Yang Chen, Markham (CA); Hongliang Wang, Markham (CA); Yan-Fei Liu, Markham (CA); Jahangir Afsharian, Markham (CA); Bing Gong, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/469,172

(22) PCT Filed: Dec. 16, 2016

(86) PCT No.: PCT/US2016/067169
§ 371 (c)(1),
(2) Date: Jun. 13, 2019

(87) PCT Pub. No.: WO2018/111301
PCT Pub. Date: Jun. 21, 2018

(65) Prior Publication Data
US 2020/0195153 A1    Jun. 18, 2020

(51) Int. Cl.
*H02M 3/335* (2006.01)
*H02M 1/00* (2006.01)

(52) U.S. Cl.
CPC ... *H02M 3/33569* (2013.01); *H02M 3/33507* (2013.01); *H02M 2001/0032* (2013.01); *H02M 2001/0058* (2013.01)

(58) Field of Classification Search
CPC ...... H02M 1/335; H02M 3/325; H02M 3/155; H02M 3/28; H02M 3/24; H02M 3/33569;
(Continued)

(56) References Cited

U.S. PATENT DOCUMENTS 10,008,942 B1 * 6/2018 Horwitz ............... H02M 1/38
2010/0308784 A1    12/2010 Scoones et al.
(Continued)

FOREIGN PATENT DOCUMENTS

| CN | 106100344 A | 11/2016 |
| JP | 2012-050264 A | 3/2012 |

(Continued)

OTHER PUBLICATIONS

Official Communication issued in International Patent Application No. PCT/US2016/067169, dated Aug. 18, 2017.
(Continued)

*Primary Examiner* — Jeffrey A Gblende
*Assistant Examiner* — Lakaisha Jackson
(74) *Attorney, Agent, or Firm* — Keating & Bennett, LLP

(57) ABSTRACT

A converter includes input voltage terminals, a series circuit connected to the input voltage terminals and including first and second switches connected in series, a transformer including a primary winding and a secondary winding, a resonant tank connected to the series circuit and including the primary winding, an auxiliary switch connected to the series circuit and the resonant tank, output voltage terminals connected to the secondary winding, and a controller that, based on a single control loop and a single control parameter, controls the auxiliary switch with pulse-width modulation and controls the first and second switches with pulse-frequency modulation.

19 Claims, 3 Drawing Sheets sLLC converter topology

(58) Field of Classification Search
CPC ..... H02M 3/33507; H02M 2001/0032; H02M 2001/0058; G05F 1/10
See application file for complete search history.

(56) References Cited

U.S. PATENT DOCUMENTS

| | | | |
|---|---|---|---|
| 2013/0241516 A1 | 9/2013 | Ueno et al. | |
| 2013/0301308 A1* | 11/2013 | Hosotani | H02M 3/33576 363/21.03 |
| 2014/0036549 A1 | 2/2014 | Li | |
| 2014/0098574 A1* | 4/2014 | Hara | H02M 3/33592 363/21.02 |
| 2014/0104890 A1* | 4/2014 | Matsubara | H02M 3/33584 363/17 |
| 2015/0381064 A1 | 12/2015 | Matsubara et al. | |
| 2016/0141951 A1* | 5/2016 | Mao | H02M 1/36 363/21.02 |

FOREIGN PATENT DOCUMENTS

| | | |
|---|---|---|
| JP | 2013-192422 A | 9/2013 |
| KR | 10-2014-0016849 A | 2/2014 |
| WO | 2015/004989 A1 | 1/2015 |
| WO | 2017/049179 A1 | 3/2017 |

OTHER PUBLICATIONS

Zhang et al., "Digital PWM/PFM Controller with Input Voltage Feed-Forward for Synchronous Buck Converters", Twenty-third Annual IEEE Applied Power Electronics Conference and Exposition, 2008, pp. 523-528.
Bi et al., "A PWM/PFM Switch Technique of Dual-Mode Buck Converter", IET International Communication Conference on Wireless Mobile and Computing (CCWMC 2009), 2009, pp. 357-360.
Official Communication issued in corresponding Chinese Patent Application No. 201680092039.8, dated Jul. 31, 2020.
Chen et al., "LLC Converter with Auxiliary Switch for Hold Up Mode Operation", IEEE Applied Power Electronics conference and Exposition, May 12, 2016, pp. 2312-2319.
Wang et al., "A New LLC Coverter Family with Synchronous Rectifier to Increase Voltage Gain for Hold-up Application", IEEE Energy Conversion Congress and Exposition, Oct. 29, 2015, pp. 5447-5453.

* cited by examiner sLLC converter topology

PFM/PWM Control Logic single loop control diagram of PFM + PWM

Flow chart

SIMPLIFIED HYBRID PWM/PFM CONTROL METHOD FOR SLLC CONVERTER

BACKGROUND OF THE INVENTION

1. Field of the Invention

The present invention relates to control methods of a resonant converter. More specifically, the present invention relates to control methods of a resonant converter, including, for example, switching LLC (sLLC) converters, with both pulse frequency modulation (PFM) and pulse width modulation (PWM).

2. Description of the Related Art

A conventional control method of a converter using both PWM and PFM uses PWM during heavy load and PFM during light load. A converter that uses both PWM and PFM will be referred to as a hybrid converter, and control of both PWM and PFM will be referred to as hybrid control. The conventional hybrid converter can be a buck converter, a flyback converter, etc. During heavy load, the output voltage is controlled by PWM with independent control parameters. When the load current is reduced to a certain level, i.e., at light loads, PWM is turned off and PFM is turned on. PFM uses an independent control loop with independent control parameters. That is, the PWM and PFM control loops are independent from each other, and the PWM and PFM control parameters are independent from each other. Conventional PFM uses hysteresis control that depends on the output voltage threshold or the output current threshold (inductor current). When the output voltage decreases below a threshold voltage, the converter operate for a certain period of time in an on state, so the output voltage increases. Then, the converter is shut down in an off state, and the output voltage decreases until the output voltage decreases below the threshold voltage again. The duration of the on state and off state is determined by the inductor current. At the beginning of the on state, the inductor current is zero. During the on state, the inductor current increases. The on state ends when the inductor current reaches a threshold current. Then, during the off state, the inductor current decreases to zero. The inductor current can be measured in any suitable manner, including using Hall effect sensor, resistors, etc. A conventional hybrid control method uses PWM with proportion-integral (PI) control to regulate the output voltage during heavy load conditions and uses PFM with hysteresis control to regulate the output voltage during light load conditions. Conventional hybrid control is complicated because of the use of two independent control loops and two independent control parameters.

SUMMARY OF THE INVENTION

To overcome the problems described above, preferred embodiments of the present invention provide a converter and a method of controlling a converter that easily determine which of PFM or PWM to use, that use only one control loop and one set of control parameters for both PFM and PWM, that sense only the output voltage, and that provide seamless transition between PFM and PWM. Preferred embodiments of the present invention also provide single converter topology in which PFM and PWM are applied to one or different switches either simultaneously or at different times based on different operating conditions.

Preferred embodiments of the present invention provide one or more of the following:

1) simplification of timing and transition of PFM and PWM;
2) single control loop for both PFM and PWM;
3) simplification of the sensing circuits for control signal generation because only the output voltage needs to be sensed; and
4) reduction of voltage spike caused by the transition between PFM and PWM.

According to a preferred embodiment of the present invention, a converter includes input voltage terminals, a series circuit connected to the input voltage terminals and including first and second switches connected in series, a transformer including a primary winding and a secondary winding, a resonant tank connected to the series circuit and including the primary winding, an auxiliary switch connected to the series circuit and the resonant tank, output voltage terminals connected to the secondary winding, and a controller that, in a first range of a control parameter, controls the auxiliary switch with a duty cycle of zero and controls the first and second switches with pulse-frequency modulation with a switching frequency in a range of a minimum switching frequency at a highest control parameter in the first range and a maximum switching frequency at a lowest control parameter in the first range and that, in a second range of the control parameter that is greater than the first range, controls the auxiliary switch with pulse-width modulation with the duty cycle greater than zero and controls the first and second switches with the minimum switching frequency.

Preferably, the controller controls, based on a single control loop, the switching frequency of the pulse-frequency modulation and the duty cycle of the pulse-width modulation. The controller preferably determines the control parameter based on an input voltage and an output voltage.

The controller preferably uses a clock and a resettable counter to provide the control parameter. The controller preferably controls the switching frequency by adjusting a time when the resettable counter resets. The controller preferably controls the duty cycle by adjusting an on time of the auxiliary switch while keeping when the resettable counter resets constant.

The auxiliary switch is preferably turned on and off to maintain an output voltage level to perform a voltage boost operation.

The converter further preferably includes a rectification stage connected between the secondary winding and the output voltage. The rectification stage preferably does not use discrete diodes to provide rectification.

The controller preferably determines the control parameter based on proportion-integral control of an output voltage.

According to a preferred embodiment of the present invention, a converter includes input voltage terminals, a series circuit connected to the input voltage terminals and including first and second switches connected in series, a transformer including a primary winding and a secondary winding, a resonant tank connected to the series circuit and including the primary winding, an auxiliary switch connected to the series circuit and the resonant tank, output voltage terminals connected to the secondary winding, and a controller that, based on a single control loop and a single control parameter, controls the auxiliary switch with pulse-width modulation and controls the first and second switches with pulse-frequency modulation.

Preferably, the controller, in a first range of the single control parameter, controls the auxiliary switch with a duty cycle of zero and controls the first and second switches with pulse-frequency modulation with a switching frequency in a range of a minimum switching frequency at a highest control parameter in the first range and a maximum switching frequency at a lowest control parameter in the first range. Preferably, the controller, in a second range of the single control parameter that is greater than the first range, controls the auxiliary switch with pulse-width modulation with the duty cycle greater than zero and controls the first and second switches with the minimum switching frequency.

The controller preferably determines the single control parameter based on an input voltage and an output voltage.

The controller preferably uses a clock and a resettable counter to provide the single control parameter. The controller preferably controls the switching frequency by adjusting when the resettable counter resets. The controller preferably controls the duty cycle by adjusting an on time of the auxiliary switch while keeping a time when the resettable counter resets constant.

The converter further preferably includes a rectification stage connected between the secondary winding and an output voltage. The rectification stage preferably does not use discrete diodes to provide rectification.

The controller preferably determines the single control parameter based on proportion-integral control of an output voltage.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
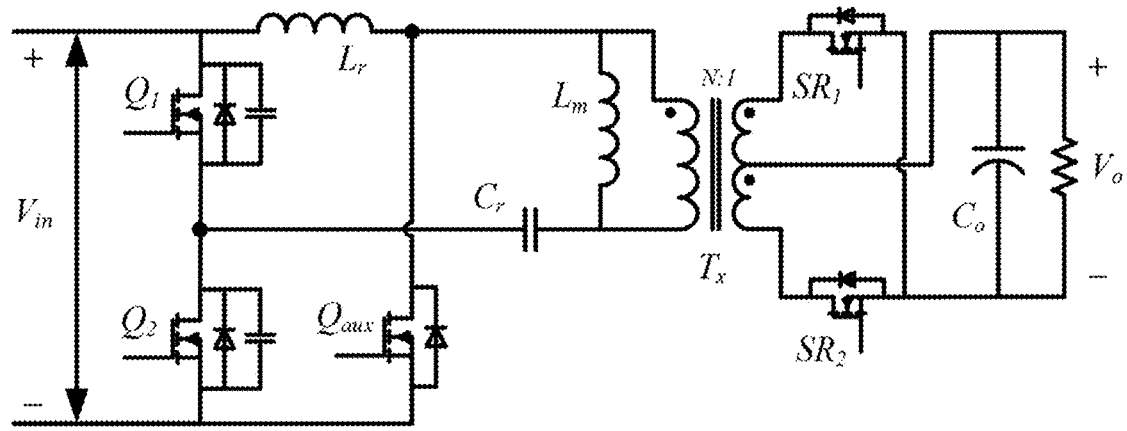
FIG. 1 is a circuit diagram showing sLLC converter topology.

FIG. 1 shows an sLLC converter topology that can be used with hybrid control according to preferred embodiments of the present invention. The sLLC converter includes a primary side and a secondary side. The primary side is the side of the converter located between the DC input $V_{in}$ and the transformer $T_x$. The secondary side is the side of the converter located between the transformer $T_x$ and the output voltage $V_O$.

The primary circuit includes primary switches $Q_1$, $Q_2$, resonant inductor $L_r$, resonant capacitor $C_r$, switch $Q_{aux}$, and inductor $L_m$. The primary switches $Q_1$, $Q_2$ are connected to input voltage $V_{in}$. The resonant inductor $L_r$, the inductor $L_m$, and the resonant capacitor $C_r$ are connected in series with each other and are connected between the positive terminal of the input voltage $V_{in}$ and a node between the primary switches $Q_1$, $Q_2$. Switch $Q_{aux}$ is connected between the negative terminal of the input voltage $V_{in}$ and a node between the resonant inductor $L_r$ and the inductor $L_m$. Inductor $L_m$ is connected in parallel across the primary windings of the transformer $T_x$. The transformer turns ratio is N.

Different arrangements of resonant inductor $L_r$, resonant capacitor $C_r$, inductor $L_m$, and switch $Q_{aux}$ are possible, as shown, for example, in U.S. Application No. 62/220,465 and PCT Application No. PCT/US2016/052278. The entire contents of both applications are hereby incorporated by reference. As shown in U.S. Application No. 62/220,465 and PCT Application No. PCT/US2016/052278, resonant inductor $L_r$, resonant capacitor $C_r$, and inductor $L_m$ define an LLC resonant tank and can have different arrangements with respect to the switches $Q_1$, $Q_2$ and the transformer Tx, and the switch $Q_{aux}$ can be connected between the resonant tank and the series-connected switches $Q_1$, $Q_2$ in any suitable manner. For example, one terminal of the switch $Q_{aux}$ can be connected to one of the positive terminal of the input voltage, the negative terminal of the input voltage $V_{in}$, and the node between the series-connected switches $Q_1$, $Q_2$, and another terminal of the switch $Q_{aux}$ can be connected to node between any two of the resonant inductor $L_r$, the resonant capacitor $C_r$, and the inductor $L_m$ in the resonant tank.

The secondary circuit includes synchronous rectifiers $SR_1$, $SR_2$, and capacitor $C_O$. A resistor represents the resistance of load at the output voltage $V_o$. Synchronous rectifiers $SR_1$, $SR_2$ are connected to the secondary windings of the transformer $T_x$ and define a rectifying stage that provides a rectified output at the output voltage $V_O$. The rectifying stage does not include or use diodes to provide a rectified output.

Operation of the converter shown in FIG. 1 is discussed below with reference to specific operating conditions, e.g. a normal input voltage range of about 320 V to about 400 V. The specific operating conditions are examples only. It should be understood, for example, that the nominal input voltage range of about 320 V to about 400 V is only an example and that other ranges are possible. It should also be understood, for example, that "about" in the input voltage range of about 320 V to about 400 V includes manufacturing and component tolerances.

Switch Qaux is off (i.e., a zero duty cycle) when the input voltage is between about 320 V to about 400 V (where about 400 V is the maximum input voltage Vin_max); thus, when the input voltage is in this range, the converter operates as a conventional sLLC converter with PFM, i.e., with high switching frequency at high input voltage and with low switching frequency at low input voltage. At an input voltage of about 320 V, the converter is operating at peak gain in PFM at which the switching frequency is at a predefined minimum value, referred to as minimum switching frequency fs_min.

When the input voltage $V_{in}$ falls below about 320 V and is between about 250 V to about 320 V (where about 250 V is the minimum input voltage Vin_min), switches $Q_1$, $Q_2$ operate at the minimum switching frequency fs_min, and the switch $Q_{aux}$ is turned on and operates with PWM control. The switching frequency of the switch $Q_{aux}$ is fixed at the minimum switching frequency fs_min, and the duty cycle of the switch $Q_{aux}$ is increased as the input voltage $V_{in}$ falls. The switch $Q_{aux}$ is turned on and off to an output voltage level to maintain provide voltage boost operation.

Control based on the input voltage $V_{in}$ provides line regulation, as opposed to load regulation, which is based on the output voltage $V_O$ and which is discussed below.

Only one control loop and one set of control parameters are used to control both PWM and PFM. The single control loop simplifies the two control loops of the conventional control methods discussed above that use both PWM and PFM.

For PFM, the control parameter is used to control the switching frequency, and for PWM, the control parameter is used to control the duty cycle. As explained below, the switching frequency and the duty cycle can be controlled with a single control parameter. If a digital controller is used, then the controller cannot directly output switching frequency or duty cycle. The controller outputs on-time Ton and switching period Ts based on an internal clock and a resettable counter in the controller. For example, using a 1-ns clock cycle, if the counter resets every 1000 clock cycles, then switching period Ts is 1 µs, and the switching frequency is 1 MHz. If the controller outputs high logic (e.g., outputs one) when the counter is lower than 450 and outputs logic low (e.g., outputs zero) when the counter is larger than 450, then the duty cycle is 45%. Thus, the controller implements PFM by changing the switching period Ts in each control cycle with fixed on-time Ton/switching period Ts ratio. Similarly, the controller implements PWM by changing the on-time Ton value while keeping the switching period Ts constant.

In the digital implementation of hybrid control, the control parameter is Ts_PI. The control parameter Ts_PI determines the switching period Ts but is modified based on the output voltage $V_O$. For example, the switching period Ts can be modified based on PI control of the output voltage $V_O$, where the proportional portion of the PI control is the instantaneous error between the output voltage $V_O$ and a reference voltage and the integral portion of the PI control is the cumulative error over time between the output voltage $V_O$ and a reference voltage. PI control is only one way of providing load regulation, and it is possible to provide load regulation in other ways, including, for example, PID control, which includes a derivative portion.

In PFM of switches Q1, Q2, the effective switching period Ts is limited in a predefined range between the minimum PFM switching period Ts_pfm_min and maximum switching period Ts_pfm_max, which corresponds to input voltages of about 400 V and about 320 V, respectively. The difference between the minimum PFM switching period Ts_pfm_min and the maximum PFM switching period Ts_pfm_max is the control window Ts_pfm_w. Thus, the switching period Ts, or the control parameter Ts_PI, will be within zero and the control window [0, Ts_pfm_w] to provide PFM. For example, if the control parameter Ts_PI is zero, then PFM is performed with the minimum PFM switching period Ts_pfm_min, and if the control parameter Ts_PI is equal to the control window Ts_pfm_w, then PFM is performed with the maximum PFM switching period Ts_pfm_max. If switching period Ts, or control parameter Ts_PI, is larger than the control window Ts_pfm_w, then the excess part is the PWM on-time Ta_pwm_on in PWM of the switch Qaux with the maximum PFM switching period Ts_pfm_max as the switching period.

Figure 2:
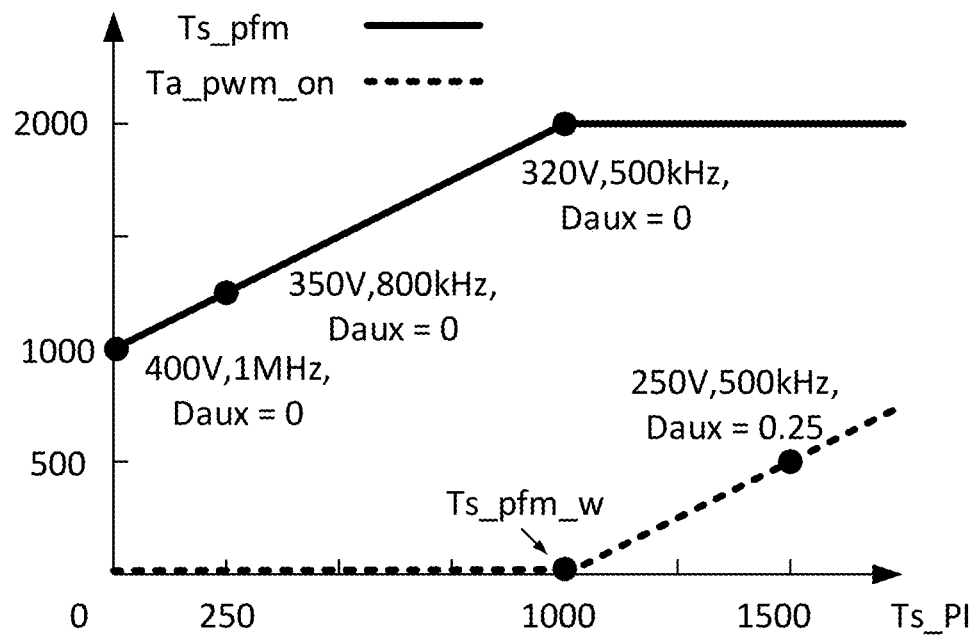
FIG. 2 shows PFM/PWM control logic according to a preferred embodiment of the present invention.

Consider the example in which the minimum PFM switching period Ts_pfm_min is 1000 clock cycles (with 1-ns clock) for 400 V. The control parameter Ts_PI is 0, and thus, the corresponding switching frequency is 1 MHz for 400V. If the input voltage $V_{in}$ drops to 350 V, the control parameter Ts_PI increases from 0 to 250 clock cycles, and thus, the switching period is 1250 (Ts_pfm_min+Ts_PI) clock cycles, which means that the switching frequency is 800 kHz. Similarly, if the input voltage $V_{in}$ is 320 V, the control parameter Ts_PI reaches the maximum value, i.e., the control window Ts_pfm_w=1000 clock cycles, and thus, the switching period (Ts_pfm_min+Ts_PI) increases to 2000 clock cycles, which means that the switching frequency is 500 kHz. If the input voltage $V_{in}$ falls to 250 V, the control parameter Ts_PI increases to 1500 clock cycles, with the total switching period being 2500 clock cycles. Then instead of reducing the switching frequency of the switches Q1, Q2 to 400 kHz, the switching frequency of the switches Q1, Q2 will remain at 500 kHz (i.e., 2000 clock cycles), and the switch Qaux will turn on for 500 clock cycles (i.e., a duty cycle Daux=0.25). The control logic is summarized in FIG. 2. As shown in FIG. 2, the PFM switching period Ts_pfm can have a linear relationship with the control parameter Ts_PI when the control parameter Ts_PI is between 0 and 1000 clock cycles and can be constant when the control parameter Ts_PI is greater than 1000 clock cycles. The PWM on-time Ta_pwm_on can be zero when the control parameter Ts_PI is between 0 and 1000 clock cycles and can have a linear relationship with the control parameter Ts_PI when the control parameter Ts_PI is greater than 1000 clock cycles.

Figure 3:
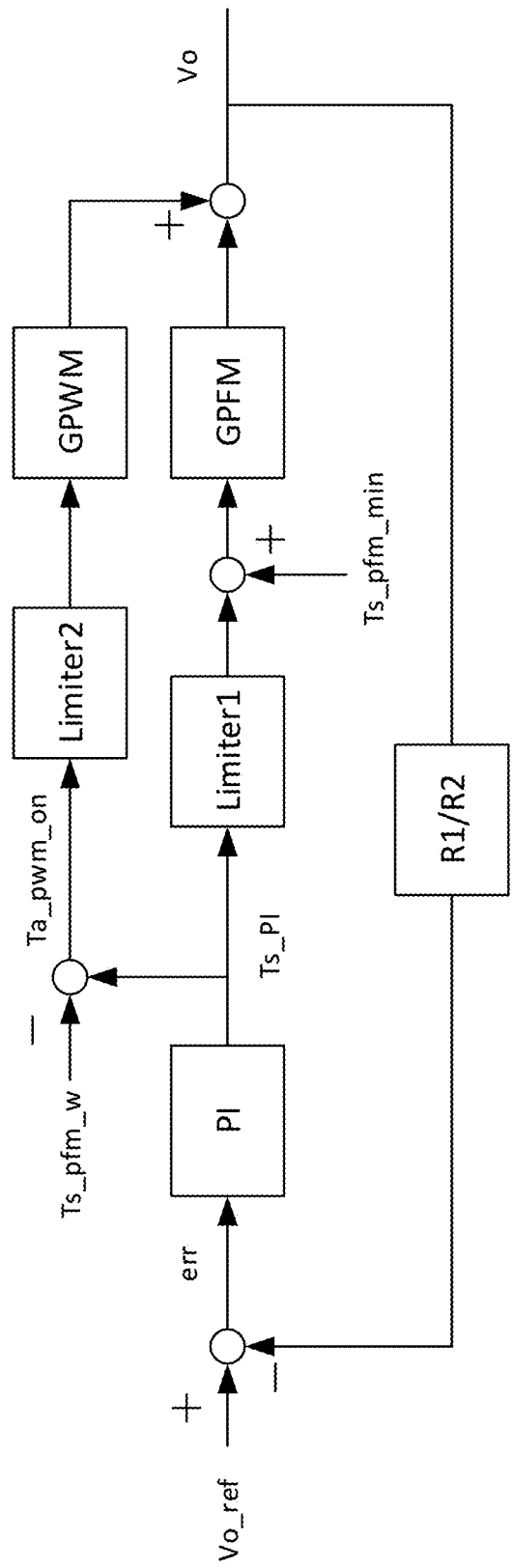
FIG. 3 is a diagram of a single-loop PFM/PWM control method according to a preferred embodiment of the present invention.

FIG. 3 shows a control diagram for the hybrid control of the preferred embodiments of the present invention. The hybrid control can be implemented by programming and/or configuring a controller to provide the control shown in FIG. 3. The controller can be, for example, a microcontroller unit (MCU), a digital signal processor (DSP), or other IC chip with a timer and PWM modules or similar circuits.

The output voltage $V_O$ is modified by a factor of R1/R2, where resistors R1, R2 define a voltage divider. The resistors R1, R2 can be located separately form the controller. The modified output voltage $V_O$ is compared with the reference Vo_ref to generate the error signal err. The control parameter Ts_PI is generated by the PI controller based on the error signal err.

For PFM, Limiter1 is used to limit the maximum value of the control parameter Ts_PI as predefined by the control window Ts_pfm_w. The output of Limiter1 will be added to minimum PFM switching period Ts_pfm_min and then multiplied by GPFM, which is the open loop transfer function of the sLLC converter with PFM control.

For PWM, the PWM on-time Ta_pwm_on is determined by control parameter Ts_PI minus the control window Ts_pfm_w, which will determine the on-time of the switch Qaux. Limiter2 limits the minimum value of the PWM on-time Ta_pwm_on to zero. If the PWM on-time Ta_pwm_on<0, then the output of Limiter2 is 0 and the switch Qaux is off, and if the PWM on-time Ta_pwm_on>0, then Qaux will be turned on for the number clock cycles determined by the value of the PWM on-time Ta_pwm_on. Limiter2 could also limit the maximum value of PWM on-time Ta_pwm_on, if applicable. GPWM is the open loop transfer function of the sLLC converter with PWM control. The output voltage $V_O$ is the summation of the outputs of the GPFM and the GPWM.

Figure 4:
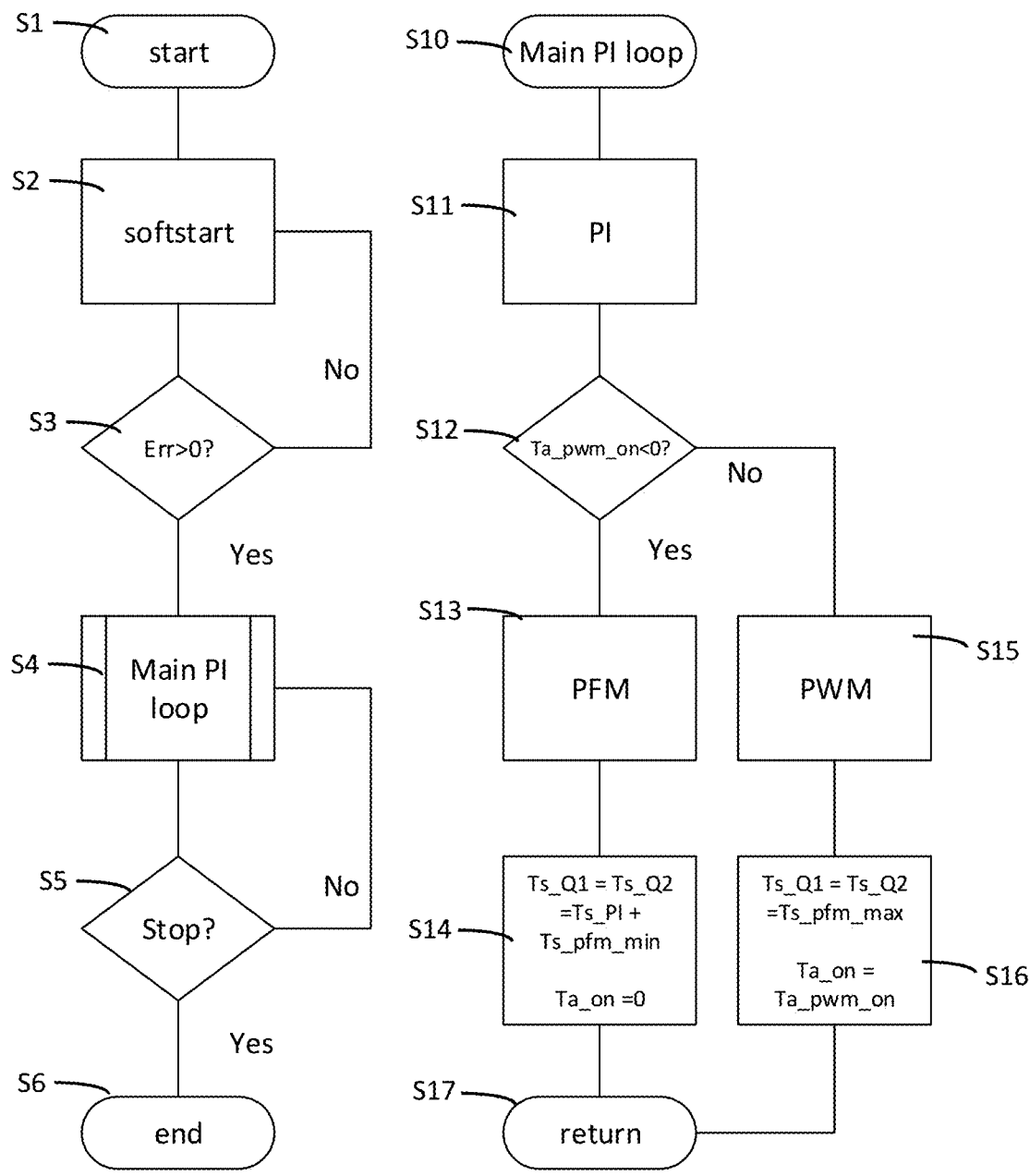
FIG. 4 is a flowchart showing a control method according to a preferred embodiment of the present invention.

FIG. 4 shows a flow chart for hybrid control according to preferred embodiments of the present invention. At step S1, the converter is started. In steps 2 and 3, the converter undergoes a soft start process until the converters reach a steady state, i.e., when the error signal is greater than zero. In step s4, at steady state, the output of PI controller will determine the on and off times of the switches Q1, Q2, and Qaux according to the above-described hybrid control. During steady state (i.e., step S4), control is determined by steps S10-S17. Step S5 determines if the converter has been stopped, and if it has, the converter is shut down in step S6.

Step S10 is the start of the main control loop. In Step S11, PI control is performed. In step S12, if the PWM on-time Ta_pwm_on is less than zero, then PFM is performed in steps S13 and S14. As shown in step S14, the on-time for the switch Q1 is Ts_Q1, the on-time for the switch Q2 is Ts_Q2, Q1 on-time Ts_Q1 equals Q2 on-time Ts_Q2, both Q1 on-time Ts_Q1 and Q2 on-time Ts_Q2 are equal to the control parameter Ts_PI plus the minimum PFM switching period Ts_pfm_min, and the switch Qaux is off, i.e., Qaux on-time Ta_on is zero. If in step S12, if the PWM on-time Ta_pwm_on is greater than zero, then PWM is performed in steps S15 and S16. As shown in step S16, Q1 on-time Ts_Q1 equals Q2 on-time Ts_Q2, both Q1 on-time Ts_Q1 and Q2 on-time Ts_Q2 are equal to the maximum PFM switching period Ts_pfm_max, and Qaux on-time Ta_on is equal to the PWM on-time Ta_pwm_on. In step 17, control is returned to steps S4 and S5.

Although hybrid control of the preferred embodiments of the present invention have been discussed with respect to the specific converter topology shown in FIG. 1, hybrid control of the preferred embodiments can be implemented with any the converter topologies shown in U.S. Application No. 62/220,465 and PCT Application No. PCT/US2016/052278.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:
   input voltage terminals;
   a series circuit connected to the input voltage terminals and including first and second switches connected in series;
   a transformer including a primary winding and a secondary winding;
   a resonant tank connected to the series circuit and including the primary winding;
   an auxiliary switch connected to the series circuit and the resonant tank;
   output voltage terminals connected to the secondary winding; and
   a controller that, based on a single control loop:
      in a first range of a control parameter, controls the auxiliary switch with a duty cycle of zero and controls the first and second switches with pulse-frequency modulation with a switching frequency in a range of a minimum switching frequency at a highest control parameter in the first range and a maximum switching frequency at a lowest control parameter in the first range; and
      in a second range of the control parameter that is greater than the first range, controls the auxiliary switch with pulse-width modulation with the duty cycle greater than zero and controls the first and second switches with the minimum switching frequency.

2. The converter of claim 1, wherein the controller determines the control parameter based on an input voltage and an output voltage.

3. The converter of claim 1, wherein the controller uses a clock and a resettable counter to provide the control parameter.

4. The converter of claim 3, wherein the controller controls the switching frequency by adjusting a time when the resettable counter resets.

5. The converter of claim 3, wherein the controller controls the duty cycle by adjusting an on time of the auxiliary switch while keeping a time when the resettable counter resets constant.

6. The converter of claim 1, wherein the auxiliary switch is turned on and off to maintain an output voltage level to perform a voltage boost operation.

7. The converter of claim 1, further comprising a rectification stage connected between the secondary winding and the output voltage.

8. The converter of claim 7, wherein the rectification stage does not use discrete diodes to provide rectification.

9. The converter of claim 1, wherein the controller determines the control parameter based on proportion-integral control of an output voltage.

10. A converter comprising:
    input voltage terminals;
    a series circuit connected to the input voltage terminals and including first and second switches connected in series;
    a transformer including a primary winding and a secondary winding;
    a resonant tank connected to the series circuit and including the primary winding;
    an auxiliary switch connected to the series circuit and the resonant tank;
    output voltage terminals connected to the secondary winding; and
    a controller that, based on a single control loop and a single control parameter, controls the auxiliary switch with pulse-width modulation and controls the first and second switches with pulse-frequency modulation.

11. The converter of claim 10, wherein the controller, in a first range of the single control parameter, controls the auxiliary switch with a duty cycle of zero and controls the first and second switches with pulse-frequency modulation with a switching frequency in a range of a minimum switching frequency at a highest control parameter in the first range and a maximum switching frequency at a lowest control parameter in the first range.

12. The converter of claim 11, wherein the controller, in a second range of the single control parameter that is greater than the first range, controls the auxiliary switch with pulse-width modulation with the duty cycle greater than zero and controls the first and second switches with the minimum switching frequency.

13. The converter of claim 10, wherein the controller determines the single control parameter based on an input voltage and an output voltage.

14. The converter of claim 10, wherein the controller uses a clock and a resettable counter to provide the single control parameter.

15. The converter of claim 14, wherein the controller controls the switching frequency by adjusting a time when the resettable counter resets.

16. The converter of claim 14, wherein the controller controls the duty cycle by adjusting an on time of the auxiliary switch while keeping a time when the resettable counter resets constant.

17. The converter of claim 10, further comprising a rectification stage connected between the secondary winding and an output voltage.

18. The converter of claim 17, wherein the rectification stage does not use discrete diodes to provide rectification.

19. The converter of claim 10, wherein the controller determines the single control parameter based on proportion-integral control of an output voltage.

\* \* \* \* \*